US 8,585,857 B2

(12) United States Patent
Goglio

(10) Patent No.: US 8,585,857 B2
(45) Date of Patent: Nov. 19, 2013

(54) METHOD AND EQUIPMENT FOR BUTT JOINING THE ENDS OF A FLEXIBLE, HEAT-SEALING LAMINATE AND LAMINATE THUS OBTAINED

(75) Inventor: Franco Goglio, Milan (IT)

(73) Assignee: Goglio S.p.A., Milan (IT)

( * ) Notice: Subject to any disclaimer, the term of this patent is extended or adjusted under 35 U.S.C. 154(b) by 785 days.

(21) Appl. No.: 12/694,588

(22) Filed: Jan. 27, 2010

(65) Prior Publication Data

US 2010/0196666 A1    Aug. 5, 2010

(30) Foreign Application Priority Data

Feb. 4, 2009 (IT) .................................. MI09A0143

(51) Int. Cl.
*B65H 69/06* (2006.01)
*B65H 21/02* (2006.01)

(52) U.S. Cl.
USPC .................................... 156/304.3; 156/304.6

(58) Field of Classification Search
USPC ............. 156/304.3, 304.5, 304.6; 242/554.1, 242/554.2
See application file for complete search history.

(56) References Cited

U.S. PATENT DOCUMENTS

| 4,067,760 | A | * | 1/1978 | Nelson | 156/157 |
| 4,091,150 | A | * | 5/1978 | Roelofs | 428/57 |
| 4,390,388 | A | * | 6/1983 | Nagata et al. | 156/351 |
| 4,401,504 | A | * | 8/1983 | Kobayashi | 156/505 |
| 4,526,638 | A | * | 7/1985 | Clements | 156/159 |
| 4,951,893 | A | | 8/1990 | Yuito | |
| 5,863,381 | A | | 1/1999 | Magota et al. | |
| 2005/0167053 | A1 | | 8/2005 | Gajewski et al. | |

FOREIGN PATENT DOCUMENTS

| DE | 32 03 644 A1 | 8/1982 |
| DE | 200 19 539 U1 | 2/2001 |
| EP | 1 184 311 A1 | 3/2002 |
| WO | 0248013 A1 | 6/2002 |

OTHER PUBLICATIONS

Search Report in Corresponding Application No. IO 1815/ IT MI20090143 Dated Oct. 2, 2009.

* cited by examiner

*Primary Examiner* — Mark A Osele
(74) *Attorney, Agent, or Firm* — Young & Thompson

(57) ABSTRACT

A method for butt joining a band (W) of flexible material, heat-sealing on at least one side and pre-printed on the opposite side, the band (W) being unwound from a parent reel (10), cut longitudinally into strips (W1, W2) and rewound into reels or rolls (20), the method consisting in overlaying the tail edge (L1) of a finished parent reel on top of the leading edge (L2) of a new parent reel, so that the printing of the one coincides with that of the other, cutting the band transversely along a line (R) in the area of overlaying of the edges (L1, L2), removing the ends (E1, E2) trimmed from the edges (L1, L2) and heat sealing on the heat-sealing side of the band (W), along the cutting line (R), a strip of heat-sealing material (S).

4 Claims, 2 Drawing Sheets

METHOD AND EQUIPMENT FOR BUTT JOINING THE ENDS OF A FLEXIBLE, HEAT-SEALING LAMINATE AND LAMINATE THUS OBTAINED

The present invention refers to a method for butt joining the ends of a flexible heat-sealing laminate. The invention also concerns the equipment for performing said method as well as the laminate with the ends butt joined by said method.

In the packaging of products, such as food products for example, use is made of single- or multi-layered laminates, normally pre-printed on the outer surface, which are unwound from reels of the appropriate width.

Such reels are in turn obtained by rewinding and longitudinal cutting of a laminate which is unwound from a parent roll of greater width and diameter.

In the course of the rewinding operation, during replacement of a finished reel with a new one, it is necessary to butt join the tail edge of the finished reel with the leading edge of the new reel.

This is done by bringing the two ends of the band together, matching the ends so as not to alter any image printed thereon, and applying to both sides thereof an adhesive tape of a colour that contrasts with that of the printing on the band of sheet material.

The joins in the band thus obtained will be present on the individual reels or rolls which will then be used to package the products.

Therefore, during packaging, the operator must intervene to eliminate the package on which the adhesive tape in present, in that this cannot be considered tightly sealed.

This is the reason why the adhesive tape is of a colour that contrasts with that of the printing on the sheet material, so that it can be more readily identified. To further aid identification of the adhesive tape, a flag is inserted in the reel to coincide therewith, but this can be lost during handling.

In some situations, the package can be eliminated automatically at the end of the line, for example in the case of vacuum packages, by means of a feeler which detects a package that has become soft through loss of the vacuum. However, in this case it is necessary for the loss of vacuum to be of such an entity as to allow the package to collapse, otherwise said package would be considered suitable at the time of production, only to be found later not to be airtight.

It is evident that the method of butt joining the ends currently in use holds various drawbacks, which range from the need to discard the packages on which these joins fall, to having to stop the packaging line in some cases to remove unsuitable packages, with a consequent loss of production time, to the need for an operator to be made responsible for removing the packages corresponding to the joins.

Object of the invention is to eliminate the above mentioned drawbacks.

In particular, object of the invention is to avoid waste of packages or the risk that unsuitable packages are placed on the market, to avoid down times of the packaging lines and to avoid having an operator responsible for visually checking the positioning of the joins on the packages.

This object is achieved by the invention with the characteristics listed in the appended independent claims.

Advantageous embodiments of the invention will be apparent from the dependent claims.

Essentially, according to the invention for butt joining the ends of the band of flexible material, use is made of a strip of heat-sealing material, which is sealed to the side of the laminate destined to be disposed inside the formed package.

The strip of heat-sealing material is applied during cutting of the ends of the band by means of a suitable sealing bar able to ensure tensile strength during machine processing. The strip of material is preferably heat sealing on both sides so as also to ensure the tightness of the end package.

Depending upon the use, the heat sealing strip may comprise at least one layer of barrier material.

The point of application of the strip is appropriately chosen so as to be situated at an area of the package that is not visible from the outside, for example on the underside thereof.

Further characteristics of the invention will be made clearer by the detailed description that follows, referring to a purely exemplary and therefore non limiting embodiment thereof, illustrated in the appended drawings, wherein.

Figure 1:
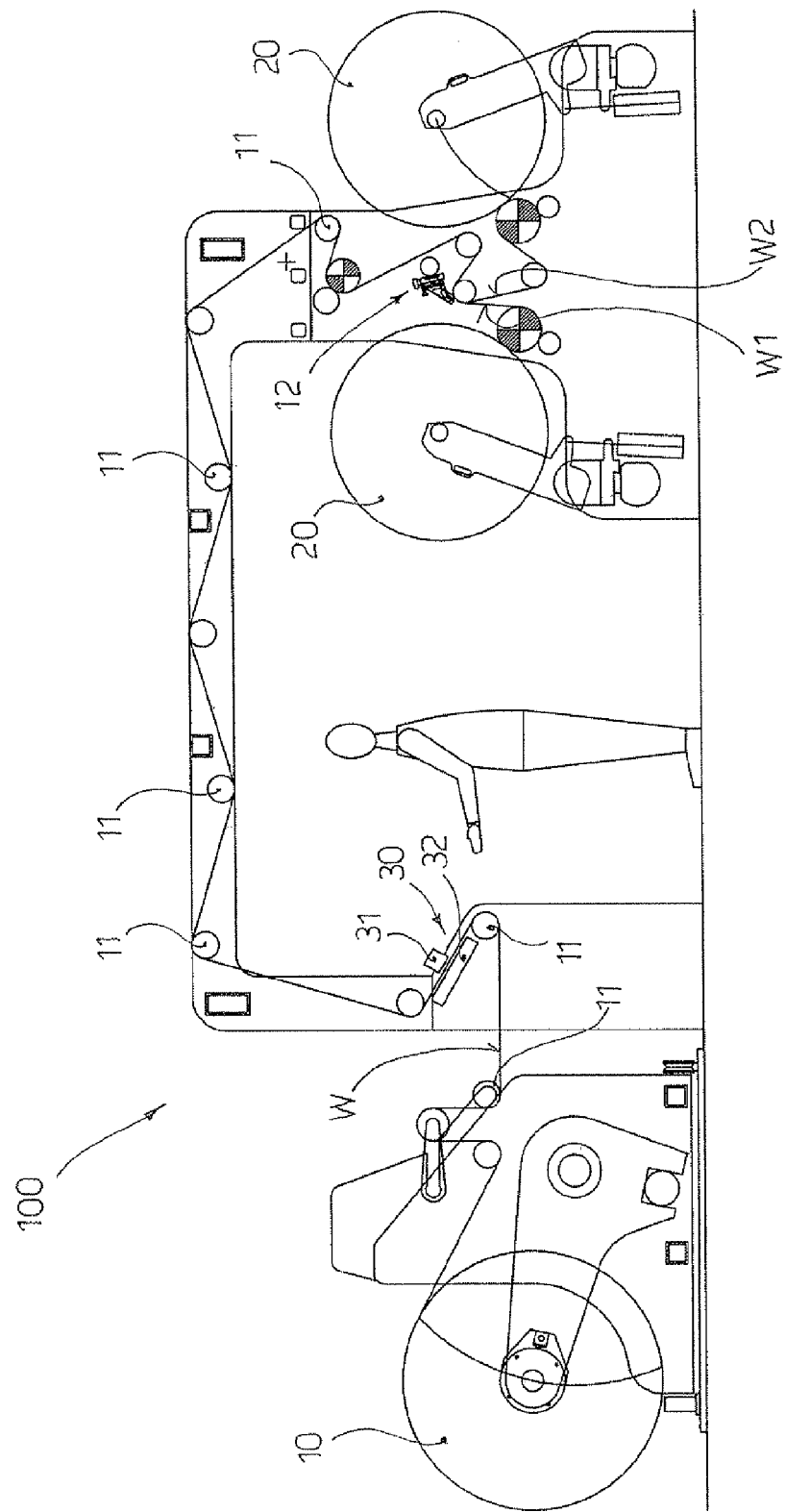
FIG. 1 is a diagrammatic side elevation view of a re-winding machine with longitudinal cutting into strips of bands of sheet material.

With reference to said figures and for now in particular to FIG. 1, a rewinding-cutting machine for sheet material, indicated as a whole with reference numeral 100, is described.

A band of sheet material W, which is normally a multi-layered flexible laminate, is unwound from a parent reel 10, passes through a plurality of relay rollers 11, is cut longitudinally into strips W1, W2 by a cutter indicated as a whole by 12, and is then re-wound into rolls or reels 20, destined for the packaging lines.

Figure 2:
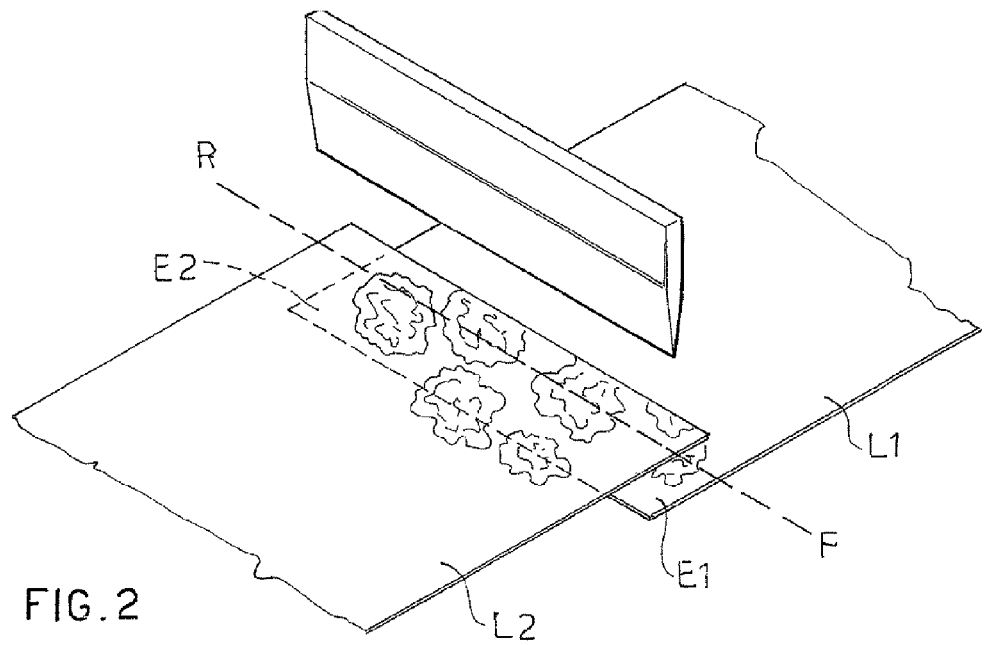
FIGS. 2 and 3 are diagrammatic perspective views showing the operations of butt joining of the ends of the band of sheet material.
Figure 3:
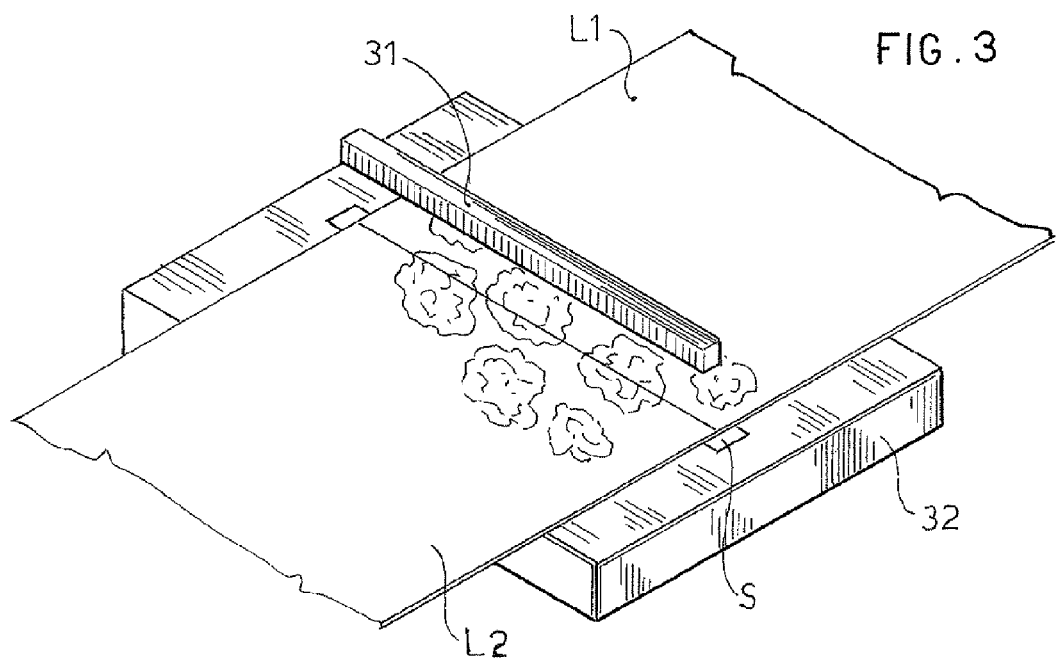

As stated, the band W is normally a flexible multi-layered laminate, heat-sealing at least on one side and possibly pre-printed on the opposite side, as shown in FIGS. 2 and 3. Along the path of travel of the band W from the unwinder of the parent reel 10 to the winders of the rolls or reels 20 is disposed a butt joining station 30 for the band, that is, to join the tail edge L1 of a finished parent reel to the leading edge L2 of a new parent reel (FIGS. 2 and 3).

Figure 4:
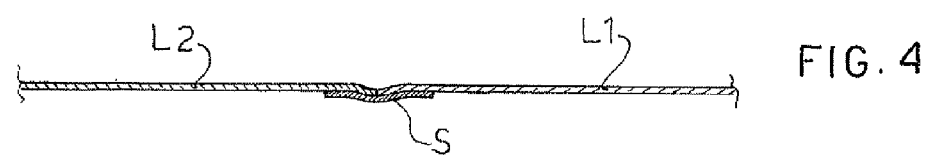
FIG. 4 is a longitudinal section taken at a butt join of the band.

FIGS. 2 to 4 show diagrammatically the way in which the edges L1 and L2 are butt joined to each other.

First, said edges L1 and L2 are laid one on top of the other, in such a way that the printing provided thereon is made to match, thus determining a perfect continuity.

A transverse cut is then made along a line R in the area where the two edges are overlaid, and the ends E1 and E2 that have been trimmed are eliminated so that the pattern printed on one follows perfectly from that printed on the other, as shown in FIG. 3. In the case of non printed material, the operation does not require perfect overlaying of the print.

At this point, a strip S of heat-sealing material is applied along the cutting line R, side-on the unprinted band destined to be disposed inside the package, at least on the side facing the band W, so that it can be intimately sealed thereto by means of a sealing bar 31 extending transversely to the band and acting against a counter-plate 32.

FIG. 4 shows diagrammatically in section a butt join between the edges L1 and L2 of the band W, with the heat-sealing strip S which causes a perfect seal of the butt join.

The strip S is advantageously heat-sealing on both sides, so that the side thereof that remains exposed after application to the band presents the same heat-sealable characteristics as the inner surface of the band, thus ensuring the tightness of the end package, allowing seals to be made in the area of the strip S.

In fact, during joining of the band the cutting line R, and thus the area of application of the strip S, is chosen so that it is not visible from the outside, being disposed for example on the underside of the package.

It should further be noted that the strip has a very limited width, smaller than that of the adhesive tape normally used in the prior art.

If necessary, the strip S may comprise a layer of barrier material.

From what has been described the advantages of the invention are apparent in that it allows packaging lines to work continuously without having to worry about discarding the packages on which the butt joins of the band have fallen.

Of course, the invention is not limited to the particular embodiment previously described and illustrated in the appended drawings, but numerous modifications of detail within the reach of a person skilled in the art can be made thereto without departing from the scope of the invention, as set forth in the appended claims.

The invention claimed is:

1. A method for butt joining ends of a flexible laminated band (W) destined for product packaging having at least the side destined to be disposed inside the package which is heat-sealing, said band (W) being unwound from a parent reel (10), longitudinally cut into strips (W1, W2) and re-wound in rolls or reels (20), the method comprising the steps of:
    overlaying a tail edge (L1) of a band (W) from a finished parent reel on the top of leading edge (L2) of a band (W) from a new parent reel,
    performing a transverse cut across the bands along a cutting line (R) in the area where the two edges (L1) and (L2) are overlaid,
    eliminating the ends (E1, E2) that have been trimmed from the edges (L1, L2) in such a manner that the cut edges are butt-joined to one another,
    applying along said cutting line (R) and said heat-sealing side of the band (W) a strip (S) having two surfaces of heat-sealing material, the surface of the strip facing the heat sealing side of band (W) being an inner surface, and the surface of the strip remaining exposed being an exterior surface, said strip comprising a layer of barrier material, and
    heat sealing the heat-sealing strip (S) to the heat-sealing side of the band (W).

2. The method according to claim 1, wherein the side of said band (W) of flexible laminated material opposite the heat-sealing side is pre-printed, said edges (L1, L2) being overlaid in such a manner that the respective printed parts are perfectly aligned, said trimming determining a perfect continuity in the printing provided on said edges (L1, L2).

3. The method according to claim 1, further comprising the steps of:
    unwinding said band (W) being unwound from a parent reel (10),
    longitudinally cutting said band (W) into strips (W1, W2), winding the strips (W1, W2) in rolls or reels (20), and
    wherein the steps of overlaying the tail edge (L1), performing a transverse cut, eliminating the ends (E1, E2), applying a strip (S) of heat-sealing material, and heat sealing the heat-sealing strip (S) are performed after said unwinding step and before said winding step, and
    wherein said steps of unwinding said band (W), longitudinally cutting said band (W) into strips (W1,W2) and winding the strips (W1, W2) are performed continuously.

4. A method for butt joining the ends of a flexible laminated band (W) destined for product packaging having at least the side destined to be disposed inside the package which is heat-sealing, said band (W) being unwound from a parent reel (10), longitudinally cut into strips (W1, W2) and re-wound in rolls or reels (20), the method comprising the steps of:
    unwinding said band (W) being unwound from a tail edge (L1) from a first parent reel (10),
    overlaying the tail edge (L1) of the band from a first parent reel on a top of the leading edge (L2) of a band from a second parent reel,
    performing a transverse cut across the bands along a cutting line (R) in the area where the two edges (L1) and (L2) are overlaid,
    eliminating the ends (E1, E2) that have been trimmed from the edges (L1, L2) in such a manner that the cut edges are butt-joined to one another,
    applying along said cutting line (R) and said heat-sealing side of the band (W) a strip (S) having two surfaces of heat-sealing material, the surface of the strip facing the heat sealing side of band (W) being an inner surface, and the surface of the strip remaining exposed being an exterior surface,
    heat sealing the heat-sealing strip (S) to the heat-sealing side of the band (W),
    longitudinally cutting said band (W) with said heat-sealing strip (S) into strips (W1, W2), and
    winding the strips (W1, W2) in rolls or reels (20),
    wherein said steps of unwinding said band (W), longitudinally cutting said band (W) into strips (W1,W2) and winding the strips (W1,W2) are performed in a continuous manner.

* * * * *